United States Patent
Yang et al.

(10) Patent No.: US 12,533,484 B2
(45) Date of Patent: Jan. 27, 2026

(54) TEMPERATURE-CONTROLLED MATTRESS CONTROL SYSTEM AND METHOD BASED ON SLEEP POSTURE DETECTION

(71) Applicants: TIANJIN CHENGJIAN UNIVERSITY, Tianjin (CN); Zhejiang Hengxi Optoelectronics Technology Co., Ltd, Taizhou (CN)

(72) Inventors: Bin Yang, Tianjin (CN); Pengfei Yang, Tianjin (CN); Pengju Liu, Tianjin (CN); Huangcheng Yao, Tianjin (CN); Bingan Pan, Tianjin (CN); Dacheng Jin, Tianjin (CN); Angui Li, Tianjin (CN)

(73) Assignees: TIANJIN CHENGJIAN UNIVERSITY, Tianjin (CN); Zhejiang Hengxi Optoelectronics Technology Co. Ltd, Taizhou (CN)

( * ) Notice: Subject to any disclaimer, the term of this patent is extended or adjusted under 35 U.S.C. 154(b) by 937 days.

(21) Appl. No.: 17/739,051

(22) Filed: May 6, 2022

(65) Prior Publication Data

US 2022/0401691 A1    Dec. 22, 2022

(30) Foreign Application Priority Data

Jun. 10, 2021  (CN) .......................... 202110649650.9

(51) Int. Cl.
*A61M 21/02*  (2006.01)
*A47C 21/00*  (2006.01)
(Continued)

(52) U.S. Cl.
CPC ............ *A61M 21/02* (2013.01); *G16H 20/30* (2018.01); *G16H 40/63* (2018.01);
(Continued)

(58) Field of Classification Search
CPC .......... A61M 21/02; A61M 2021/0066; A61M 2205/3313; A61M 2205/3368;
(Continued)

(56) References Cited

U.S. PATENT DOCUMENTS

| | | | |
|---|---|---|---|
| 2011/0295083 A1* | 12/2011 | Doelling | A61B 5/11 600/407 |
| 2016/0015184 A1* | 1/2016 | Nunn | A47C 27/082 700/282 |
| 2023/0173221 A1* | 6/2023 | Shouldice | G16H 20/40 600/26 |

\* cited by examiner

*Primary Examiner* — Carrie R Dorna
*Assistant Examiner* — Joshua Daryl D Lannu
(74) *Attorney, Agent, or Firm* — Zhigang Ma

(57) ABSTRACT

Temperature-controlled mattress control system and method based on sleep posture detection are provided. The control system includes an information collecting unit, an information processor and an output instruction unit. The information collecting unit is used to collect a temperature parameter of a human body during sleeping, video information, and a temperature parameter of a temperature-controlled mattress. The information processing unit receives information collected by the information collecting unit, calculates a sleep posture value K, a thermal sensation value P and a facial skin thermal value Q to obtain a final estimated thermal sensation, and determines setting temperature variation of the temperature-controlled mattress based on the temperature parameter of the temperature-controlled mattress. The output instruction unit receives the setting temperature variation and the temperature parameter of the temperature-controlled mattress, and issues an instruction to a water chiller-heater unit to enable the water chiller-heater unit to carry out fluid temperature regulation.

10 Claims, 3 Drawing Sheets

(51) Int. Cl.
*A47C 21/04* (2006.01)
*A47C 23/00* (2006.01)
*A47C 27/00* (2006.01)
*A47C 27/08* (2006.01)
*A61M 21/00* (2006.01)
*G16H 20/30* (2018.01)
*G16H 40/63* (2018.01)
*G16H 40/67* (2018.01)
*G16H 50/20* (2018.01)

(52) U.S. Cl.
CPC ............... *A61M 2021/0066* (2013.01); *A61M 2205/3313* (2013.01); *A61M 2205/3368* (2013.01); *A61M 2230/62* (2013.01)

(58) Field of Classification Search
CPC .......... A61M 2230/62; A61M 2205/36; A61M 2230/50; G16H 20/30; G16H 40/63; G16H 40/67; G16H 50/20; A47C 21/044; A47C 21/048; A47C 23/00; A47C 21/00; A47C 27/00; A47C 27/085
See application file for complete search history.

Bedding coverage rate of human body:67%

TEMPERATURE-CONTROLLED MATTRESS CONTROL SYSTEM AND METHOD BASED ON SLEEP POSTURE DETECTION

CROSS-REFERENCE TO RELATED APPLICATION

This application claims a priority to a Chinese patent application No. 202110649650.9 filed to the China National Intellectual Property Administration on Jun. 10, 2021. The content of the above-mentioned application is incorporated herein by reference in its entirety.

TECHNICAL FIELD

The invention relates to the field of sleep bedding microenvironment control, and more particularly to temperature-controlled mattress control system and method based on sleep posture detection.

BACKGROUND

People spend about one-third of their lives in sleeping. Sleep is the main way to eliminate physical fatigue, and good sleep quality is very important for human health and daytime productivity. Poor sleep quality can impair cognitive abilities of elderly people and affect the development of brain function of adolescents. Disordered nighttime sleep would affect health and increase the risk of obesity, diabetes and cardiovascular diseases. The human thermoregulatory system is closely related to sleep regulation mechanism. Studies have shown that the quality of sleep is closely related to the thermal environment of sleep, especially the indoor ambient temperature and humidity have a greater impact on sleep quality. Many studies have confirmed that excessively high or low room temperature would significantly degrade sleep quality.

Previous studies have shown that, regardless of in summer or in winter, during sleep, a change of human thermal comfort caused by a change of air temperature is greater than an influence brought by a change of average radiation temperature. In recent years, with the development of local heating and cooling control technology and individual microenvironment control technology, studies have shown that, compared with the change of head thermal sensation with indoor air temperature, the thermal sensation of covered body is more sensitive to the change of bedding microenvironment temperature, and the bedding microenvironment has a greater impact on human thermal comfort. It can be seen that one of most effective ways to ensure human thermal comfort during sleep is to change the bedding microenvironment around the human body, rather than the indoor thermal environment. This is also the best strategy to ensure individual thermal comfort during sleep on the premise of without consuming too much energy. Scholars have developed temperature-controlled experimental devices that can change surface temperatures of beds or mattresses, such as electric heating blankets, cold and hot water integrated mattresses and other temperature control mattresses. These temperature-controlled mattresses can significantly improve the thermal environment of bedding for sleeping personnel. However, affected by the outdoor physical environment and other factors, the indoor load at night is constantly changing. For example, the indoor cooling load at night in summer generally reaches a peak at the beginning of sleep, drops rapidly in the next 2~3 hours, and then decreases slowly. Therefore, in the middle and late stage of sleep, it is generally necessary to slightly increase the set temperature of the temperature-controlled mattress, in order to provide a more comfortable thermal environment for sleep and achieve the purpose of energy saving.

Although there is already method of user customizing times of on-off, but it is generally only to satisfy the personnel at the beginning of sleep, the quality of sleep would be inevitably affected if requiring the user to manually adjust the device at night, thereby bringing a lot of inconvenience to the user.

SUMMARY

In order to overcome the problems in the related art, the invention, based on computer vision technology, provides temperature-controlled mattress control system and method based on sleep posture detection, so as to automatically control a setting temperature of a temperature-controlled mattress and thereby satisfy thermal comfort of human sleep and reduce waste of energy.

In order to achieve the above objective, the invention provides technical solutions as follows.

A temperature-controlled mattress control system based on sleep posture detection, includes: information collecting unit, an information processing unit, and an output instruction unit;

the information collecting unit is configured (i.e., structured and arranged) to collect a temperature parameter of a human body during sleeping, video information, and a temperature parameter of a temperature-controlled mattress; the information collecting unit comprises an infrared sensor, a camera, and a temperature sensor;

the information processing unit is configured to receive information collected by the information collecting unit, calculate a sleep posture value K, a thermal sensation value P and a facial skin thermal value Q to obtain a resultant estimated thermal sensation, and determine a variation of a setting temperature of the temperature-controlled mattress based on the temperature parameter of the temperature-controlled mattress; and the output instruction unit is configured to receive the variation of the setting temperature and the temperature parameter of the temperature-controlled mattress, and output an instruction to a water chiller-heater unit of the temperature-controlled mattress to enable the water chiller-heater unit to regulate a fluid temperature (e.g., water temperature) of the temperature-controlled mattress.

In an embodiment, the infrared sensor is configured to be mounted on a headboard for a bed and detect a facial temperature T of the human body in real time.

In an embodiment, the camera is configured to be mounted on an upper part of a room and collect the video information of sleeping personnel.

In an embodiment, the temperature sensor is configured to be mounted at a fluid inlet pipe of the temperature-controlled mattress and monitor an inlet fluid temperature of the temperature-controlled mattress.

The invention further provides a temperature-controlled mattress control method based on sleep posture detection, adapted for the temperature-controlled mattress control system of any one of the above embodiments. The temperature-controlled mattress control method may include steps S1~S3 as follows:

S1, collecting video information of sleeping personnel, real-time facial temperature T of a human body, and an inlet fluid temperature of a temperature-controlled mattress;

S2, obtaining key point information of the human body in the video information of the sleeping personnel by using a human body posture algorithm, to a sleep posture value K, processing the video information of the sleeping personnel by image binarization to obtain a bedding coverage rate S of a quilt on the human body and thereby obtain a thermal sensation value P, comparing the real-time facial temperature T of the human body with preset values to obtain a facial skin thermal value Q; and S3, determining a resultant estimated thermal sensation based on the sleep posture value K, the thermal sensation value P and the facial skin thermal value Q to thereby obtain a fluid temperature variation $\Delta T_S$ of the temperature-controlled mattress, and regulating the inlet fluid temperature of the temperature-controlled mattress based on the fluid temperature variation $\Delta T_S$ of the temperature-controlled mattress.

In an embodiment, in the step S2, a sleep posture of the human body is determined by calculating cosine values corresponding to key points of the human body.

In an embodiment, the sleep posture of the human body is one of curling and stretching, the stretching is set as a default sleep posture, and a method for determining the sleep posture of the human body is:

$$K = \begin{cases} 0 & \max\{\cos J, \cos M\} > -0.9397 \\ 1 & \max\{\cos J, \cos M\} \leq -0.9397 \\ 0 & \cos J, \cos M \text{ unattainable and } \max\{\cos C, \cos F\} > -0.5 \\ 1 & \cos J, \cos M \text{ unattainable and } \max\{\cos C, \cos F\} \leq -0.5 \\ 1 & \cos J, \cos M, \cos C \text{ and } \cos F \text{ all unattainable} \end{cases}$$

where, K=0 represents the human body is in a posture of the curling, K=1 represents the human body is in a posture of the stretching, 0.9397 and (−0.5) both are empirical values.

In an embodiment, in the step S2, determining the human body as being in a thermal comfort state or feeling cold when the bedding coverage rate S≥80%, corresponding to that the thermal sensation value P=0; or, determining the human body as feeling hot when the bedding coverage rate S<80%, corresponding to that the thermal sensation value P=1.

In an embodiment, in the step S2, determining as feeling hot and outputting the facial skin thermal value as Q=1 when the facial temperature T>35.8° C., determining as feeling cold and outputting the facial skin thermal value as Q=−1 when the facial temperature T<34.2° C., otherwise determining the human body as being in a thermoneutral state and outputting the facial skin thermal value as Q=0.

In an embodiment, in the step S2, the fluid temperature variation $\Delta T_S$ is calculated through a formula $\Delta T_S = 1 - 1.067K - 0.2P - 2.2Q$.

Compared with the related art, the invention may have beneficial effects as follows.

The invention provides a temperature-controlled mattress control system based on sleep posture detection, a control object is personnel in a sleep environment such as a bedroom, which aims to improve the thermal feeling of the personnel according to information such as a feature temperature and sleep posture of the sleeping personnel. The information collecting unit collects various data information in real time, and the information processing unit performs cross-validation on the sleep posture value K, the thermal sensation value P and the facial skin thermal value Q, so as to make up for t for the problems of various technologies in unfavorable situations, greatly improve control accuracy of the control system, avoid the problems such as misjudgment and delayed determination, obtain a final estimated thermal sensation, and generate a setting temperature variation of the temperature-controlled mattress according to the temperature parameter of the temperature-controlled mattress. The output instruction unit is used to adjust the power of a water chiller-heater unit of the temperature-controlled mattress, realize the regulation of an outlet fluid temperature and accurately regulate the bedding microenvironment, so as to improve the individual sleep thermal comfort. This control method not only has great convenience, but also can ensure a highest energy utilization efficiency and thereby avoid unnecessary waste of energy.

Traditional indoor air conditioning split units and other temperature-controlled devices best only can be timed and set in temperature. The invention can collect video information and body temperature information through the noncontact measurement technology of camera and infrared temperature measurement at a definite work station in a sleep environment, as well as the fluid temperature information of the temperature-controlled mattress collected by the temperature sensor, to achieve real-time monitoring of various parameters and ensure the timeliness of the collected data. Moreover, according to the collected information, the fluid temperature of the temperature-controlled mattress is automatically controlled in real time, thereby creating a good bedding microenvironment and satisfying the sleep thermal comfort need of personnel.

Figure 1:
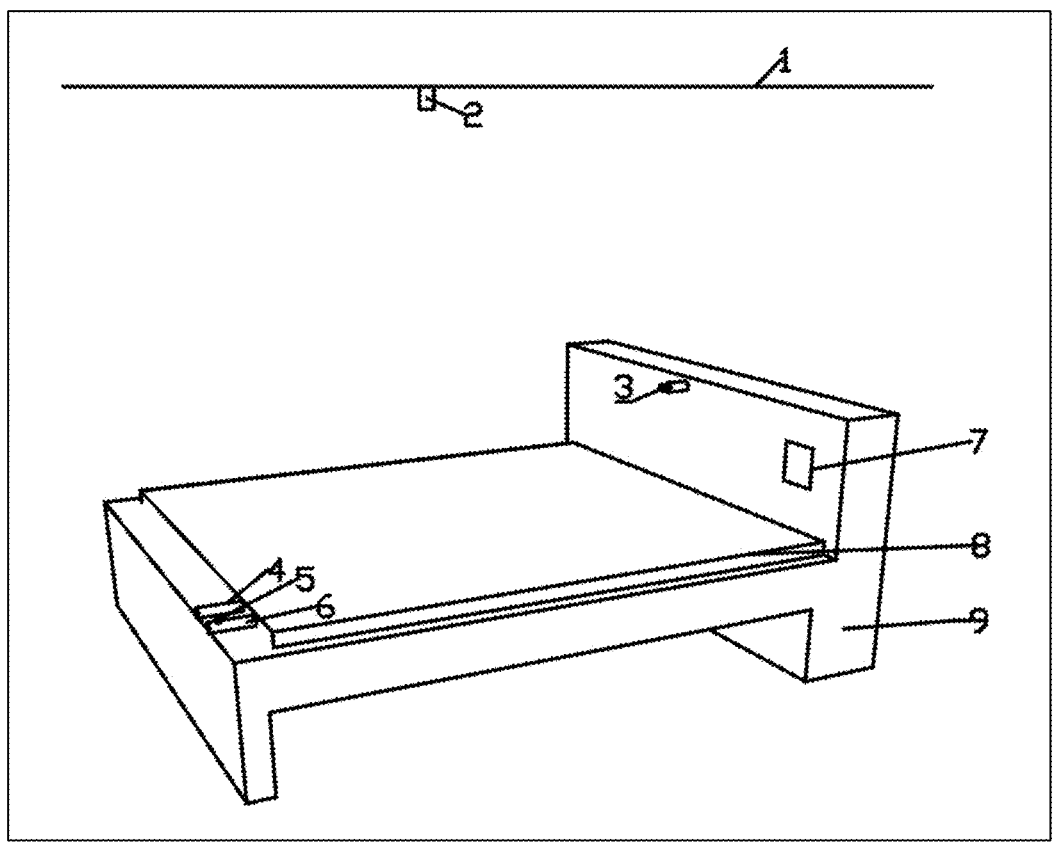
FIG. 1 illustrates a schematic diagram of a system application scenario.

In the drawings: 1—ceiling, 2—camera, 3—infrared sensor, 4—fluid outlet pipe, 5—temperature sensor, 6—fluid inlet pipe, 7—control panel, 8—temperature-controlled mattress, and 9—bed.

DETAILED DESCRIPTION OF EMBODIMENTS

The invention will be further described below in combination with accompanying drawings and concrete embodiments.

Figure 4:
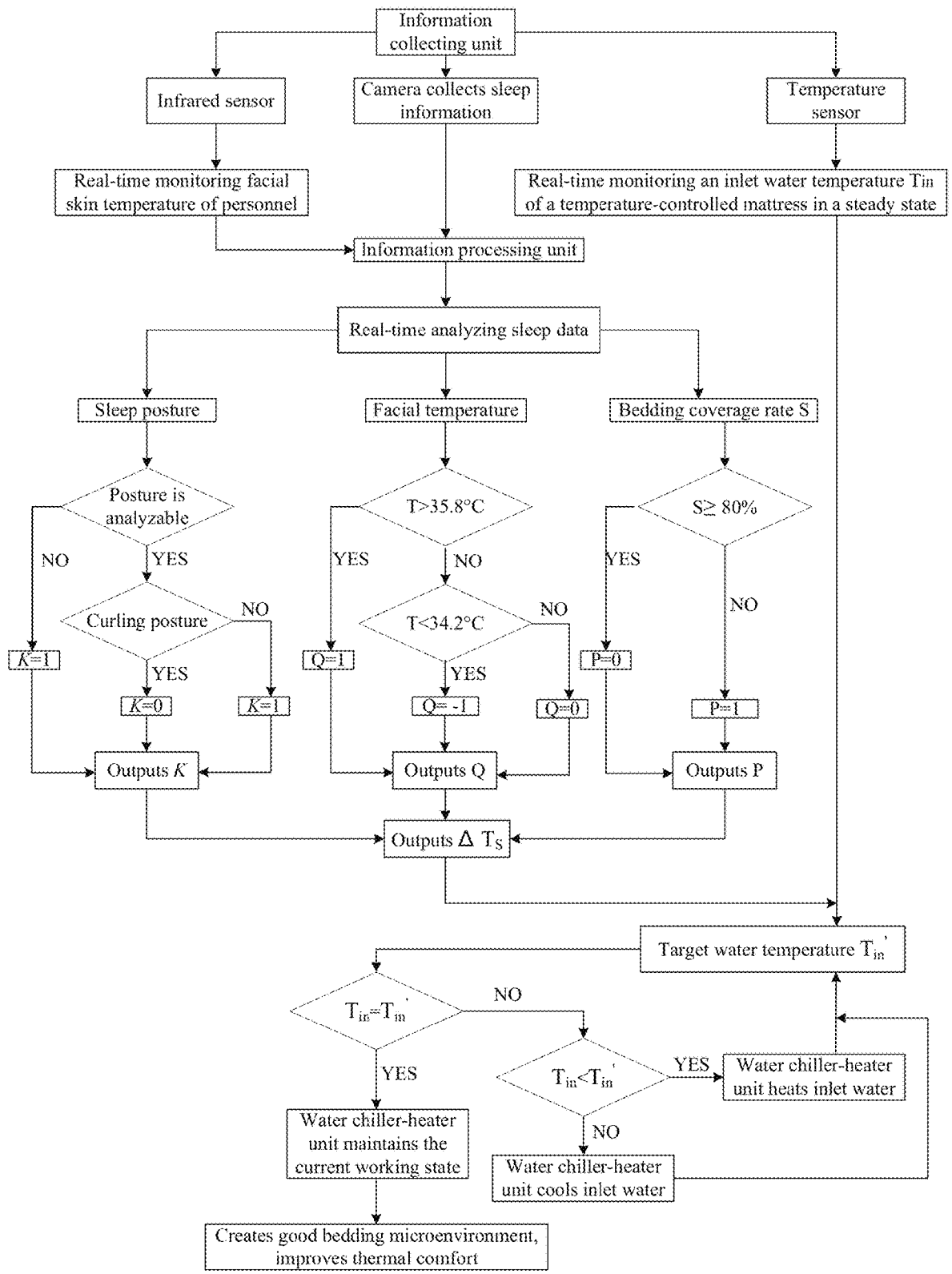
FIG. 4 is a schematic systematic flowchart.

As illustrated in FIG. 4, embodiments of the invention provide bedding microenvironment creation and temperature-controlled mattress control system and method based on sleep posture detection. The system includes an information collecting unit, an information processing unit, and an instruction output unit.

The information collecting unit is responsible for collecting a temperature parameter of a human body during sleeping, video information, and a temperature parameter of the temperature-controlled mattress. The information collecting unit specifically includes a camera 2, an infrared sensor 3, and a temperature sensor 5. The infrared sensor 3 is configured (i.e., structured and arranged) to obtain a real-time facial temperature of the human body. The camera 2 is configured to collect video information of sleeping personnel. The temperature sensor 5 is configured to monitor an inlet fluid temperature of the temperature-controlled mattress 8 in real time.

Preferably, as illustrated in FIG. 1, the camera 2 is mounted on a ceiling 1 of a room, and it is appropriate that the camera 2 can clearly capture whole scenario of bed body for sleep. The infrared sensor 3 is mounted on a headboard for a bed 9 to detect a facial skin temperature. The temperature-controlled mattress 8 is arranged on the bed 9. The temperature-controlled mattress 8 includes a fluid outlet pipe (e.g., water outlet pipe) 4 and a fluid inlet pipe (e.g., water inlet pipe) 6. The temperature sensor 5 is mounted at the fluid inlet pipe 6 of the temperature-controlled mattress 8. A control panel 7 is also arranged on the headboard.

The information processing unit is responsible for receiving various data information collected and analyzing sleep thermal comfort of personnel, and also is referred to as information processor.

1) the information collecting unit is responsible for collecting a temperature parameter of a human body during sleeping, video information, and a temperature parameter of the temperature-controlled mattress.

2) the information processing unit receives the video information collected by the camera 2, employs an openpose algorithm (i.e., one kind of human body posture estimation algorithm) to process the video information to obtain key point information of the human body, calculate cosine values of included angles among key points of the human body to obtain a sleep posture of the human body. The cosine value corresponding to each of the key points can be determined as per the formula (1) as follows:

$$\cos B = \frac{a^2 + c^2 - b^2}{-2ac} \quad (1)$$

where a, b, c are sides facing towards included angles A, B, C respectively, and cos B is the cosine value of the included angle B.

Figure 2:
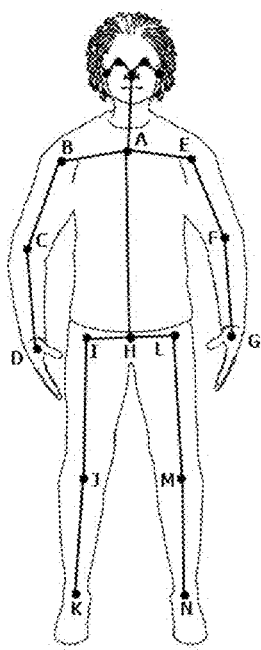
FIG. 2 illustrates a schematic model diagram of key points of a human body.

As illustrated in FIG. 2, six key points (I~N) on portions of two legs are selected, including left hip, right hip, left knee, right knee, left ankle and right ankle; and cosJ and cosM can be calculated out by using the formula (1). If the key points on the portions of the legs cannot be recognized due to a thick quilt, six key points (B~G) on arm portions can be selected instead, including left shoulder, right shoulder, left elbow, right elbow, left wrist and right wrist; and then using the formula (1) to calculate out cos C and cos F. Finally, the sleep posture of the human body can be determined based on the calculated cosine values.

Since a use scenario of this application case is the sleep situation, and according to physiological habits of the human body, he/she will show a curling posture when feeling cold, and he/she will show a limb stretching posture when feeling hot; and therefore, two sleep postures of human body are defined herein, i.e., curling posture and stretching posture. The stretching posture generally is set as the default posture.

Preferably, the sleep posture of the human body is determined based on a formula (2), and a specific determination method is as follows:

$$K = \begin{cases} 0 & \max\{\cos J, \cos M\} > -0.9397 \\ 1 & \max\{\cos J, \cos M\} \le -0.9397 \\ 0 & \cos J, \cos M \text{ unattainable and } \max\{\cos C, \cos F\} > -0.5 \\ 1 & \cos J, \cos M \text{ unattainable and } \max\{\cos C, \cos F\} \le -0.5 \\ 1 & \cos J, \cos M, \cos C \text{ and } \cos F \text{ all unattainable} \end{cases} \quad (2)$$

In the formula (2), K represents a sleep posture value, K=0 represents the human body is in the curling posture, K=1 represents the human body is in the stretching posture, 0.9397 and (−0.5) both are commonly used empirical values, cos 160°≈−0.9397, cos 120°=−0.5.

Figure 3:
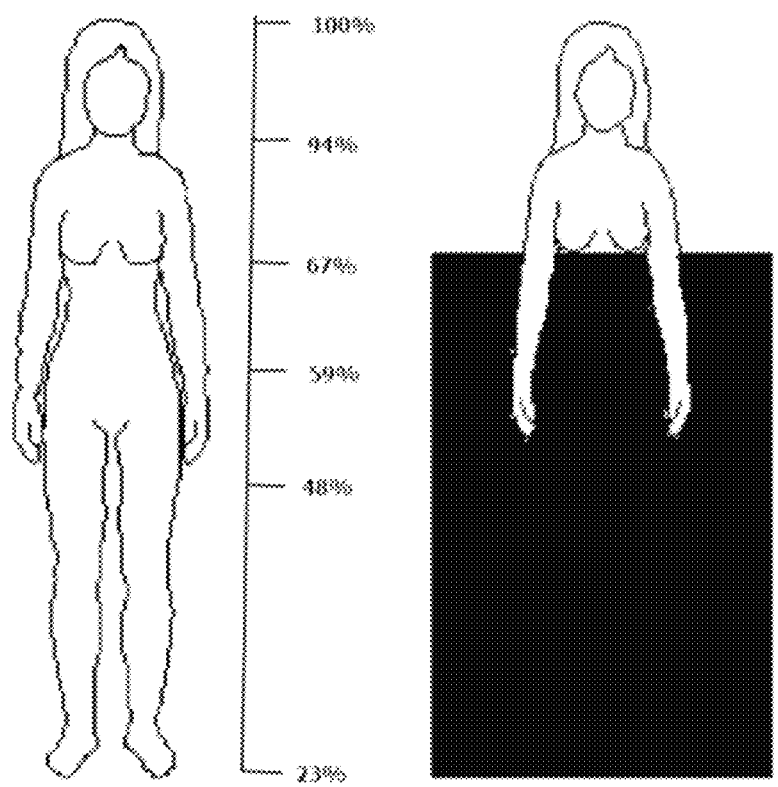
FIG. 3 illustrates a bedding coverage rate of a human body during sleeping.

3) the information processing unit receives the video information collected by the camera 2, and process the video information by an image binarization method to obtain a bedding coverage rate S of a quilt on the human body. A quantitative diagram of the bedding coverage rate is shown in FIG. 3. When the bedding coverage rate S≥80%, it is determined that the human body is in a thermal comfort state or has a cold feeling, and a thermal sensation value P=0; whereas when S<80%, it is determined that the human body has a hot feeling, and the thermal sensation value P=1.

4) the information processing unit receives facial skin temperature T detected by the infrared sensor 3. When T>35.8° C., it can be determined as having a hot feeling, a facial skin thermal value is outputted as Q=1; when T<34.2° C., it can be determined as having a cold feeling, the facial skin thermal value is outputted as Q=−1; otherwise, it can be determined as the human body being in a thermoneutral state, and the facial skin thermal value is outputted as Q=0. Herein, Q indicates the thermal state based on the facial skin temperature of the human body, Q=1 means the thermal sensation is hot, Q=0 means the thermal sensation is neutral, and Q=−1 means the thermal sensation is cold.

5) the information processing unit obtains a final estimated thermal sensation according to the values of K, P and Q. Moreover, the information processing unit receives a current fluid temperature (e.g., current water temperature) of the temperature-controlled mattress 8 detected by the temperature sensor 5 and determines a fluid temperature variation (e.g., water temperature variation) of the temperature-controlled mattress 8.

Specifically, the information processing unit, according to the values of K, P, Q, uses an empirical value fitting formula $\Delta T_S = 1 - 1.067K - 0.2P - 2.2Q$ to get fluid temperature variations (see the following Table 1) of the temperature-controlled mattress 8, and outputs a setting temperature variation to a fluid (e.g., water) chiller-heater unit.

TABLE 1

| fluid temperature variations | | | |
|---|---|---|---|
| K | P | Q | $\Delta T_S$ (° C.) |
| 0 | 0 | −1 | +3 |
| 0 | 0 | 0 | +1 |
| 0 | 1 | −1 | +3 |
| 0 | 1 | 0 | +1 |
| 1 | 0 | −1 | +2 |
| 1 | 0 | 0 | 0 |
| 1 | 0 | 1 | −2 |
| 1 | 1 | −1 | +2 |
| 1 | 1 | 0 | 0 |
| 1 | 1 | 1 | −3 |

In particular, the temperature sensor 5 located at the fluid inlet pipe 6 of the temperature-controlled mattress 8 detects the inlet fluid temperature $T_{in}$ of the temperature-controlled mattress 8. The output instruction unit, as an instruction controller, receives the inlet fluid temperature $T_{in}$ of the temperature-controlled mattress 8 detected by the temperature sensor 5 and the temperature variation $\Delta T_S$ outputted from the information processing unit, and calculates a target temperature $T_{in}'$. The output instruction unit issues an instruction to the chiller-heater unit. The chiller-heater unit then cools, heats or maintain the fluid temperature in response to the instruction.

Meanwhile, the temperature sensor 5 monitors the inlet fluid temperature $T_{in}$ of the mattress 8 in real time until $T_{in}=T_{in}'$, and then the chiller-heater unit maintains a corresponding working state to continuously treat the fluid temperature to ensure that the inlet fluid temperature of the temperature-controlled mattress 8 is a temperature required for the microenvironment creation.

As described in the above technical solution, the invention provides a temperature-controlled mattress control system based on sleep posture detection, which is mainly applied to a sleep situation, and a specific application scenario is shown in FIG. 1.

After video information captured by the camera 2 is transmitted to the information processing unit, the openpose algorithm can be used to obtain information of key points (see FIG. 2) of the human body, and then the sleep posture of the human body can be determined by analysis as per the formula (1) and formula (2), and the value of K is outputted correspondingly. K=0 indicates the curling posture, representing the human body has a cold feeling; and K=1 indicates the stretching posture, representing the human body is comfort or has a hot feeling. In a situation of the information of key points of the human body cannot be accurately recognized resulting from the sleeping personnel is covered by a thick quilt or other reasons, it may cause the posture of the human body to be unrecognized, and therefore the default posture of the system is set to be "stretching", i.e., K=1.

The information processing unit can determine the bedding coverage rate S of the sleeping personnel according to the video information after image binarization processing, and a quantitative diagram of the bedding coverage rate is shown in FIG. 3. The thermal sensation value P of the human body is estimated based on the size of S, when S<80%, P=1 is outputted, which represents more parts of the human body are exposed and the human body has a certain hot feeling; whereas when S≥80%, P=0 is outputted, which represents most of the human body is covered by bedding (e.g., a quilt), and the thermal sensation of the human body is neutral or cold.

The estimated value of thermal sensation of the human body obtained based on video image information alone may have a certain limitation, resulting from self-habits of sleeping personnel. Therefore, the estimated thermal sensation must be corrected according to an objective physiological parameter of the sleeping personnel.

Specifically, the infrared sensor 3 monitors the facial skin temperature T in real time, and under normal conditions, the facial skin temperature does not fluctuate too much. When the facial skin temperature T>35.8° C., Q=1 is outputted, which indicates the facial skin temperature is higher than the normal thermoneutral range; when T<34.2° C., Q=−1 is outputted, which indicates the facial skin temperature is lower than the normal thermoneutral range; otherwise, it can be determined the human body as being in the thermoneutral state, and Q=0 is outputted.

The information processing unit determines the final estimated thermal sensation based on the values of K, P and Q, and gives a setting temperature variation of the temperature-controlled mattress 8.

The output instruction unit sends the setting temperature variation of the temperature-controlled mattress 8 to the chiller-heater unit corresponding to the temperature-controlled mattress 8. The chiller-heater unit makes a final action response, changes the setting temperature, and accurately regulates the bedding microenvironment to achieve a thermal comfort of the human body. In the following, a concrete working situation is taken as an example to briefly describe response steps.

Taking a case of sleeping in summer as an example, a quilt only covers a part of lower limbs of the human body, the body is in the curling posture, a facial skin temperature is 34° C., and a fluid temperature of the mattress is 21° C.

After the video information captured by the camera 2 is transmitted to the information processing unit, the information is processed by the openpose algorithm, values of cosJ and cosM can be obtained as per the formula (1), and K=0 can be obtained as per the formula (2), representing the body is in the curling posture. At this time, the final instruction cannot be made.

After the video information captured by the camera 2 is transmitted to the information processing unit, the information is processed by image binarization, and the bedding coverage rate can be obtained as S=50%. Because S<80%, the thermal sensation value is outputted as P=1.

A facial skin temperature of the sleeping personnel detected by the infrared sensor 3 is 34° C., because T<34.2° C., the facial skin thermal value is outputted as Q=−1.

After obtaining the information of K=0, P=1 and Q=−1, based on the above Table 1, the information processing unit obtains the final estimated thermal sensation and gives a setting temperature variation of the temperature-controlled mattress as $\Delta T_S=+3°$ C.

The output instruction unit receives the variation of temperature and the temperature parameter of the temperature-controlled mattress detected by the temperature sensor 5, outputs an instruction of indicating $\Delta T_S=+3°$ C. to the chiller-heater unit. In addition, according to the fluid temperature detected by the temperature sensor 5 being $T_{in}=21°$ C., the chiller-heater unit may re-set the working fluid temperature as $T_{in}'=21+3=24°$ C.

The temperature sensor 5 constantly monitors the change of fluid temperature, and when the fluid temperature is $T_{in}=24°$ C., the chiller-heater unit stops increasing power, maintains the current working state, which can provide a warmer sleeping microenvironment for sleeping personnel and thereby prevent personnel from catching cold.

Working processes of other cases is the same as the above process associated with the case of sleeping in summer, and thus will not be repeated.

What is claimed is:

1. A temperature-controlled mattress control system based on sleep posture detection, comprising: an information collecting unit, an information processor, and an instruction controller;

wherein the information collecting unit is configured to collect a temperature parameter of a temperature-controlled mattress, video information of sleeping personnel, real-time facial temperature T of a human body, and an inlet fluid temperature of the temperature-controlled mattress; the information collecting unit comprises an infrared sensor, a camera, and a temperature sensor;

wherein the information processor is configured to receive information collected by the information collecting unit, calculate a sleep posture value K, a thermal sensation value P and a facial skin thermal value Q by obtaining key point information of the human body in the video information of the sleeping personnel by using a human body posture estimation algorithm, to obtain the sleep posture value K, processing the video information of the sleeping personnel by image binarization to obtain a bedding coverage rate S of a quilt on the human body and thereby obtain the thermal sensation value P, and comparing the real-time facial temperature T of the human body with preset values to obtain the facial skin thermal value Q, so as to obtain a resultant estimated thermal sensation, and determine a variation of a setting temperature of the temperature-controlled mattress based on the temperature parameter of the temperature-controlled mattress; and wherein the instruction controller is configured to receive the variation of the setting temperature and the temperature parameter of the temperature-controlled mattress, and output an instruction to a chiller-heater unit of the temperature-controlled mattress to enable the chiller-heater unit to regulate a fluid temperature of the temperature-controlled mattress.

2. The temperature-controlled mattress control system based on sleep posture detection according to claim 1, wherein the infrared sensor is configured to be mounted on a headboard for a bed and detect the real-time facial temperature T of the human body.

3. The temperature-controlled mattress control system based on sleep posture detection according to claim 1, wherein the camera is configured to be mounted on an upper part of a room and collect the video information of sleeping personnel.

4. The temperature-controlled mattress control system based on sleep posture detection according to claim 1, wherein the temperature sensor is configured to be mounted at a fluid inlet pipe of the temperature-controlled mattress and monitor the inlet fluid temperature of the temperature-controlled mattress.

5. A temperature-controlled mattress control method based on sleep posture detection, comprising:

S1, collecting video information of sleeping personnel, real-time facial temperature T of a human body, and an inlet fluid temperature of a temperature-controlled mattress;

S2, obtaining key point information of the human body in the video information of the sleeping personnel by using a human body posture estimation algorithm, to obtain a sleep posture value K, processing the video information of the sleeping personnel by image binarization to obtain a bedding coverage rate S of a quilt on the human body and thereby obtain a thermal sensation value P, comparing the real-time facial temperature T of the human body with preset values to obtain a facial skin thermal value Q; and S3, determining a resultant estimated thermal sensation based on the sleep posture value K, the thermal sensation value P and the facial skin thermal value Q to thereby obtain a fluid temperature variation $\Delta T_S$ of the temperature-controlled mattress, and regulating the inlet fluid temperature of the temperature-controlled mattress based on the fluid temperature variation $\Delta T_S$ of the temperature-controlled mattress.

6. The temperature-controlled mattress control method based on sleep posture detection according to claim 5, wherein in the step S2, a sleep posture of the human body is determined by calculating cosine values corresponding to key points of the human body.

7. The temperature-controlled mattress control method based on sleep posture detection according to claim 6, wherein the sleep posture of the human body is one of curling and stretching, the stretching is set as a default sleep posture, and a method for determining the sleep posture of the human body is:

$$K = \begin{cases} 0 & \max\{\cos J, \cos M\} > -0.9397 \\ 1 & \max\{\cos J, \cos M\} \leq -0.9397 \\ 0 & \cos J, \cos M \text{ unattainable and } \max\{\cos C, \cos F\} > -0.5 \\ 1 & \cos J, \cos M \text{ unattainable and } \max\{\cos C, \cos F\} \leq -0.5 \\ 1 & \cos J, \cos M, \cos C \text{ and } \cos F \text{ all unattainable} \end{cases}$$

where, K=0 represents the human body is in a posture of the curling, K=1 represents the human body is in a posture of the stretching, 0.9397 and (−0.5) both are empirical values.

8. The temperature-controlled mattress control method based on sleep posture detection according to claim 5, wherein in the step S2, determining the human body as being in a thermal comfort state or feeling cold when the bedding coverage rate S≥80%, corresponding to that the thermal sensation value P=0; or, determining the human body as feeling hot when the bedding coverage rate S<80%, corresponding to that the thermal sensation value P=1.

9. The temperature-controlled mattress control method based on sleep posture detection according to claim 5, wherein in the step S2, determining as feeling hot and outputting the facial skin thermal value as Q=1 when the facial temperature T>35.8° C., determining as feeling cold and outputting the facial skin thermal value as Q=−1 when the facial temperature T<34.2° C., otherwise determining the human body as being in a thermoneutral state and outputting the facial skin thermal value as Q=0.

10. The temperature-controlled mattress control method based on sleep posture detection according to claim 5, wherein in the step S2, the fluid temperature variation $\Delta T_S$ is calculated through a formula $\Delta T_S=1-1.067K-0.2P-2.2Q$.

* * * * *